United States Patent
Karlsson et al.

(10) Patent No.: US 9,162,887 B2
(45) Date of Patent: Oct. 20, 2015

(54) REFORMER REACTOR AND METHOD FOR CONVERTING HYDROCARBON FUELS INTO HYDROGEN RICH GAS

(75) Inventors: Anders Karlsson, Mölndal (SE); Lars Pettersson, Skarpnäck (SE); Bård Lindström, Stockholm (SE)

(73) Assignee: POWERCELL SWEDEN AB, Göteborg (SE)

( * ) Notice: Subject to any disclaimer, the term of this patent is extended or adjusted under 35 U.S.C. 154(b) by 312 days.

(21) Appl. No.: 13/002,338

(22) PCT Filed: Jul. 2, 2008

(86) PCT No.: PCT/SE2008/000422
§ 371 (c)(1),
(2), (4) Date: May 31, 2011

(87) PCT Pub. No.: WO2010/002292
PCT Pub. Date: Jan. 7, 2010

(65) Prior Publication Data
US 2011/0308156 A1 Dec. 22, 2011

(51) Int. Cl.
*B01J 7/00* (2006.01)
*C01B 3/38* (2006.01)
(Continued)

(52) U.S. Cl.
CPC . *C01B 3/38* (2013.01); *B01J 4/002* (2013.01); *B01J 4/004* (2013.01); *B01J 19/2405* (2013.01); *B01J 19/2415* (2013.01); *B01J 19/2485* (2013.01); *B01J 19/2495* (2013.01); *C01B 3/382* (2013.01); *B01J 2204/002* (2013.01); *B01J 2219/00108* (2013.01); *B01J 2219/00159* (2013.01); *B01J 2219/24* (2013.01); *C01B 2203/0244* (2013.01); *C01B 2203/066* (2013.01); *C01B 2203/0833* (2013.01);
(Continued)

(58) Field of Classification Search
USPC ........................................ 48/89–126
See application file for complete search history.

(56) References Cited

U.S. PATENT DOCUMENTS 2,697,032 A 12/1954 Jones
3,920,416 A 11/1975 Houseman
(Continued)

FOREIGN PATENT DOCUMENTS

EP 1231184 A2 8/2002
EP 1927579 A1 4/2008
(Continued)

OTHER PUBLICATIONS

International Search Report for corresponding International Application PCT/SE2008/000422.
(Continued)

*Primary Examiner* — Imran Akram
(74) *Attorney, Agent, or Firm* — WRB-IP LLP

(57) ABSTRACT

A reformer reactor is provided for converting hydrocarbon fuel into hydrogen rich gas by auto-thermal reaction process having a cylindrically shaped and double walled, housing with two side faces forming a reaction chamber of the reformer. Additionally, a fuel inlet is provided in one of the two side faces for providing hydrocarbon fuels into the reaction chamber, wherein further a fuel preheating means is provided which preheats the hydrocarbon fuel before the hydrocarbon fuel enters the reaction chamber.

7 Claims, 1 Drawing Sheet

(51) Int. Cl.
*B01J 4/00* (2006.01)
*B01J 19/24* (2006.01)

(52) U.S. Cl.
CPC .......... *C01B 2203/0883* (2013.01); *C01B 2203/1235* (2013.01); *C01B 2203/1282* (2013.01)

(56) References Cited

U.S. PATENT DOCUMENTS

| | | | |
|---|---|---|---|
| 4,522,894 | A | 6/1985 | Hwang et al. |
| 5,938,800 | A | 8/1999 | Verrill et al. |
| 5,997,596 | A | 12/1999 | Joshi et al. |
| 6,770,106 | B1 | 8/2004 | Okamoto et al. |
| 2003/0072700 | A1 | 4/2003 | Goebel et al. |
| 2003/0200699 | A1* | 10/2003 | Robb ........................ 48/198.7 |
| 2004/0086436 | A1 | 5/2004 | Boltze et al. |
| 2004/0151663 | A1 | 8/2004 | Nougier et al. |
| 2006/0280662 | A1* | 12/2006 | Jang et al. ................ 422/198 |
| 2007/0071662 | A1* | 3/2007 | Kawakita et al. ......... 422/199 |
| 2007/0107307 | A1* | 5/2007 | Kirwan et al. ............ 48/127.9 |
| 2008/0107937 | A1* | 5/2008 | Ravenda et al. ........... 429/19 |
| 2008/0110427 | A1* | 5/2008 | Ricci-Ottati et al. ...... 123/1 A |

FOREIGN PATENT DOCUMENTS

| | | |
|---|---|---|
| WO | 0247464 A2 | 6/2002 |
| WO | 2004090075 A2 | 10/2004 |
| WO | 2006071927 A1 | 6/2006 |

OTHER PUBLICATIONS

International Preliminary Report on Patentability for corresponding International Application PCT/SE2008/000422.
Supplementary European Search Report for corresponding European App. EP 08 76 7095.

* cited by examiner

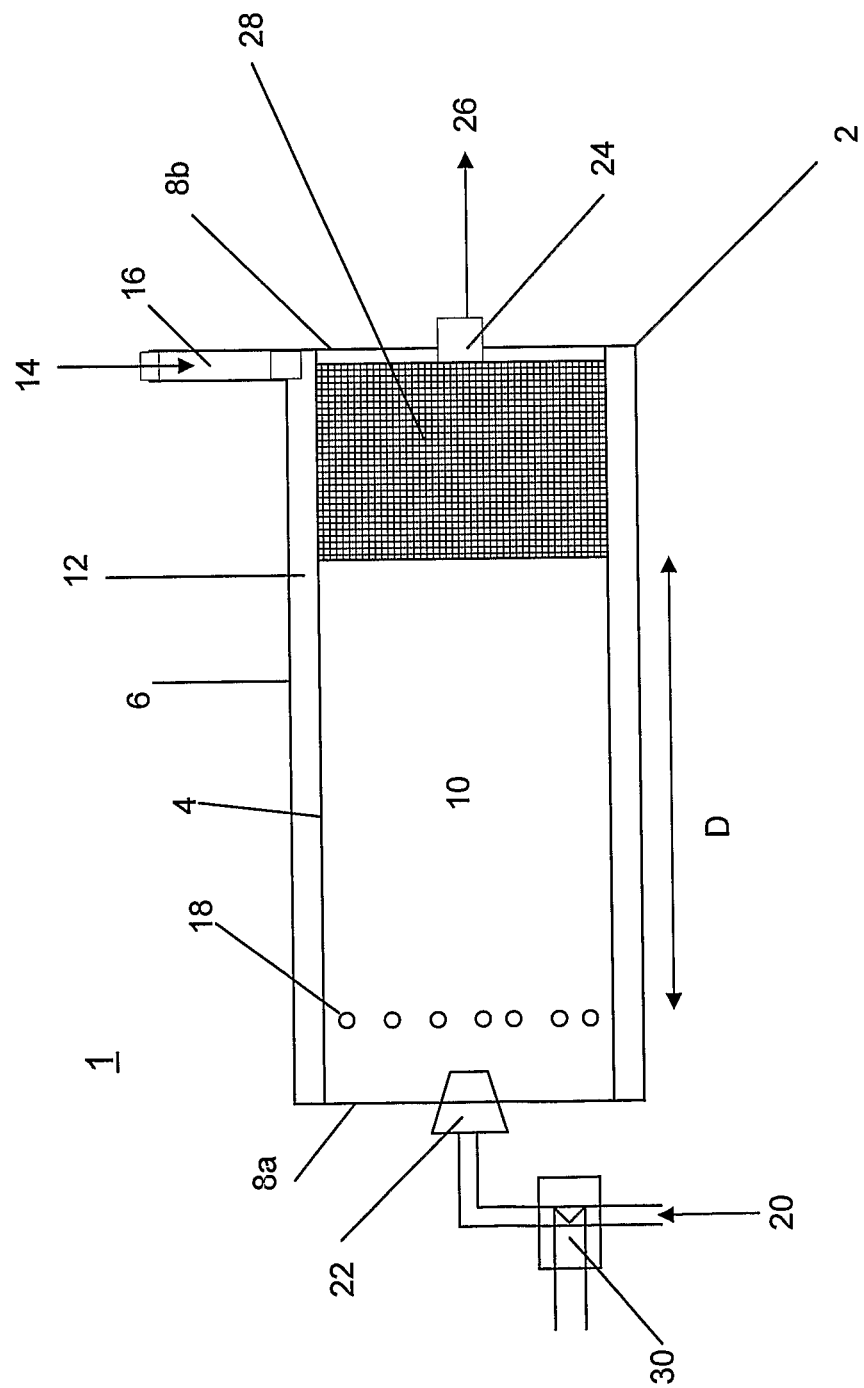

REFORMER REACTOR AND METHOD FOR CONVERTING HYDROCARBON FUELS INTO HYDROGEN RICH GAS

BACKGROUND AND SUMMARY

The present invention relates to a reformer reactor for converting hydrocarbon fuels into hydrogen rich gas for fuel cells and/or exhaust treatment applications by auto-thermal reaction and a method for converting hydrocarbon fuels into hydrogen rich gas using the reformer reactor.

In the state of the art it is well known to produce hydrogen rich gas for the use in fuels cells of transportation devices by reforming hydrocarbon fuels, like gasoline or diesel fuels. Conventionally, hydrogen is produced in large-scale industrial facilities and then stored on board of the transportation devices. The recent development of small-scale on-board hydrogen sources, so-called reformer reactors, provides a possibility for producing hydrogen on demand without the necessity of hydrogen storage.

In general there are three known methods of reforming gaseous or liquid hydrocarbon fuels into hydrogen: catalytic steam reforming, partial oxidation reforming and auto-thermal reforming.

In catalytic steam reforming processes a mixture of steam and hydrocarbon fuel is exposed to a suitable catalyst, like nickel, at a high temperature (between 7000 C and 1000° C.). The reaction is highly endothermic and requires an external source of heat and a source of steam.

In partial oxidation reforming processes a mixture of hydrogen fuel and an oxygen containing gas, like ambient air, are fed as feed gas into a reaction chamber, preferably in the presence of a catalyst. The catalyst used is normally made from a noble metal or nickel and the temperature is between 700° C. and 1700° C. The reaction is highly exothermic and once started generates sufficient heat to be self sustaining. In order to promote the oxidation reaction, it is necessary to reduce temperature variations in the reactor.

Auto-thermal reforming processes are a combination of steam reforming and partial oxidation reforming. Waste heat from the partial oxidation reforming reaction is used to heat the endothermic steam reforming reaction.

The natural by-products of all reforming processes are carbon monoxide and carbon dioxides. But, since the hydrocarbon fuels were not designed as a feed stock for generating hydrogen, there are also other by-products such as sulphur. These byproducts may be harmful to the fuel cells and should therefore be removed by subsequent steps outside the reformer reactor. Additionally, hydrocarbon fuels, especially diesel, can in the catalyst produce soot as a by-product if the mixing in the reactor is poor. Soot particles again, are very harmful to the fuel cells and care must be taken to avoid the formation of soot in the reformer.

From the state of the art, U.S. Pat. No. 6,770,106, a partial oxidizing reformer for reforming feed gas containing hydrocarbon or methane, oxygen and water, is known, wherein the reduction of temperature variations is achieved by an reactor being covered with a passage for feed gas, which is heated by the reaction heat in the reactor and therefore thermally isolate the reactor. Thereby, temperature variations inside the reactor can be reduced. For heating the feed gas, the reaction heat can be recovered by a heat exchanger.

Additionally, it has been found that a successful and efficient conversion of the feed gas into a hydrogen gas is dependent on a successful mixing of the reactants, namely hydrocarbon fuel and an oxidizing agent. The disadvantage of the known state of the art is that, since the mixing of the reactants is performed in a further, externally arranged mixer, a perfect atomization or vaporization of the hydrocarbon fuel and the oxidants without condensation of the fuel in the reaction chamber of the reformer cannot be provided.

For solving this problem it has been proposed in the state of the art e.g. to mix fuel and oxidizing agent in the reformer and, preferably, even to vaporize injected fuel by preheating the incoming air stream to be mixed with the fuel, or by preheating a reformer surface for receiving a fuel spray. Since none of the prior art approaches is entirely successful in providing a reliable, complete vaporization of the injected hydrocarbon fuel, it has been proposed in the European Patent Application EP 1 927 579, to provide a metallic element inside the reaction chamber of the reactor to provide a high temperature, high surface area for fuel vaporization.

Such a known fuel vaporizer can be e.g. an electrically-conductive metallic material in the form of a foam or spun/woven fibres onto which the fuel is sprayed, or even in the form of a cylindrical element longitudinally arranged along the inside walls of the reactor.

This known reformer has the disadvantage that the material from which the vaporizer is formed must be carefully selected. On the one hand it must have a moderate Ohmic resistance so that the vaporizer can be heated very quickly to the desired temperature, but, on the other hand, it must be chemically inert to the operating environments of the reactor. The material requirements to the cylindrically shaped vaporizer are less demanding, but this vaporizer has the disadvantage, that the heating load is increased as the vaporizer is fully exposed to both incoming air and fuel air mixture which both are also acting as coolant.

Therefore, it is desirable to provide a reformer reactor and a method for converting hydrocarbon fuels into hydrogen rich gas which provides an easy and material independent atomization of the hydrocarbon fuel into the oxidant.

According to an aspect of the present invention a substantially perfect fuel atomization and subsequent gas mixture can be achieved by pre-heating the hydrocarbon fuel before introducing and mixing the hydrocarbon fuel with an oxidizing agent. Such a preheating can be achieved by preheating means which is arranged outside of the reaction chamber of the reformer. Preferably, the preheating means is a separate device being arranged upstream to a fuel inlet, but it is also possible to integrate the fuel inlet and the preheating means in a single device. Particularly in the preferred case, where a fuel injector is used as fuel inlet, it is advantageous to heat the injector, whereby the fuel is preheated. Thereby, it is further preferred if the fuel inlet is in heat conductive contact with a side wall of the reaction chamber, so that heat generated in the reaction chamber can be transferred to the injector for pre-heating the fuel.

In a further preferred embodiment, the temperature of the preheated fuel is adapted to be close to, but below the lowest boiling point of the fuel, whereby the preferred heat required for substantially perfect atomization or vaporization is provided.

According to a further advantageous embodiment, also the oxidizing agent is preheated prior to mixing with the hydrocarbon fuel, preferably to a temperature in the same range or higher than the temperature of the preheated fuel. This substantially prevents unwanted condensation of the fuel or the oxidizing agent, which could result in a shortened life time of the reformer. The preheating of the oxidizing agent can be preferably performed by using a reformer reactor having an inner wall and an outer wall forming a space in-between, wherein said space is designed as oxidizing agent passage between an oxidizing agent supply port provided in the outer wall and an oxidizing agent inlet provided in the inner wall. The inner wall is heated by the heat of the reaction taking place inside the reaction chamber, whereby in turn the oxidizing agent is preheated by the inner wall by heat transfer from the inner wall to the oxidizing agent.

The combination of fuel preheating and mixing the atomized fuel with the oxidizing agent results in a substantially completely homogenous reactant mixture and preheating of the oxidizing agent prevents condensation. The thereby achieved substantially homogenous mixture allows for a substantially complete conversion of the hydrocarbon fuel which in turn allows for an efficient production of fuel cell grade hydrogen from heavy hydrocarbon fuel.

An advantageous side effect of the above described preheating of the oxidizing agent by heat transfer from the inner wall of the reformer to the oxidizing agent is that the heat transfer also cools the inner wall to a temperature, at which the formation of soot by burning of fuel particles coming in contact with the inner walls is substantially prevented.

Generally, there is the possibility to provide the reactor with an external cooling device but this increases the dimension of the reactor and adds a further consumer of energy to the system being supplied with energy by the fuel cells. Therefore, the preferred embodiment uses the relatively cool oxidizing agent for cooling the inner wall of the reactor. That means at the same time that a thermal isolation of the inner wall can be left out, whereby the dimension of the reactor is further reduced.

Another advantage of the cooling of the inner wall is that the temperature inside the reaction chamber can be held constant and the temperature of the oxidizing agent can be controlled.

As shown in another preferred embodiment of the present invention, the oxidizing agent inlet provided in the inner wall of the housing is formed as a plurality of orifices, particularly holes or minute slits. This facilitates the substantially homogenous distribution of oxidizing agent in the reaction chamber. Preferably, size, shape and/or location of the orifices can vary according to the used oxidizing agent, the used hydrocarbon fuel and/or their temperature. Most preferably, the oxidizing agent inlet is provided in the vicinity of the fuel inlet.

Another preferred embodiment is provided with a catalyst for the auto-thermal reaction inside the reaction chamber to accelerate the conversion of hydrocarbon fuel into hydrogen rich gas. Since the premixing is performed in the inventive manner a substantially completely homogenous mixture can be placed in contact with the catalyst and the substantial prevention of condensation also substantially prevents deactivation of the catalyst and thereby prolongs the life-time of the reformer. Preferably, the catalyst can be a ceramic monolith or metal grid. Preferably, the size of the orifices and the distance between the orifices and the fuel inlet are designed so that an optimal turbulent mixture is achieved and so that the oxidizing agent/fuel mixture is substantially completely homogenous before coming in contact with the catalyst. The distance between the mixing zone (orifice location) and the catalyst is also constructed so that the oxidizing agent achieves a mixture stabilization without causing auto oxidation of the oxidizing agent/fuel mixture.

BRIEF DESCRIPTION OF THE DRAWINGS

In the following a preferred embodiment of the reformer reactor according to the invention will be discussed with help of a drawing. The description is considered as exemplification of the principles of the invention and is not intended to limit the scope of the claims.

FIG. 1 shows a schematic view of a preferred embodiment of said reformer reactor according to the invention.

BACKGROUND AND SUMMARY

The reformer reactor 1 in FIG. 1 comprises a housing 2 with an inner wall 4, an outer wall 6 and side walls 8a, 8b. Inner wall 4 and side walls 8a, 8b define a reaction chamber 10 in which hydrocarbon fuel 20 and oxidizing agent 14 are brought together and an auto-thermal reaction can take place.

Inner wall 4 and outer wall 6 define a space 12 between them. The space 12 in turn forms a passage for oxidizing agent 14 between an oxidizing agent supply port 16 and an oxidizing agent inlet 18.

Additionally, reformer reactor 1 includes a catalyst 28 for catalyzing the auto-thermal reaction in reaction chamber 10. The catalyst 28 accelerates the auto-thermal reaction, but it is also possible to use a reformer reactor according to the present invention without a catalyst. The catalyst 28 is preferably a metal grid or ceramic monolith, but it is possible to use any other suitable substrate for the design of catalyst 28.

The oxidizing agent inlet 18 is formed as a plurality of orifices, particularly as holes and/or minute slits, the size, shape and location of which vary depending on the used oxidizing agent 14, the used hydrocarbon fuel 20 and their temperature. The plurality of orifices can have uniform size and shape, but it is also possible that the orifices vary in size and shape among each other. Preferably, the size of the orifices and the distance between the orifices and the fuel inlet are designed so that an optimal turbulent mixture is achieved and so that the oxidizing agent/fuel mixture is substantially completely homogenous before coming in contact with the catalyst 28. The distance D between the mixing zone (location of the orifices 18) and the catalyst 28 is also constructed so that the oxidizing agent achieves a mixture stabilization without causing auto oxidation of the oxidizing agent/fuel mixture.

Further, reformer reactor 1 has a hydrocarbon fuel inlet 22 which is located in side wall 8a of housing 2. Preferably, the fuel inlet 22 is formed as a fuel injector which provides a fuel spray in reaction chamber 10. A reformer gas outlet 24 is provided in the opposite side wall 8b of housing 2. Reformer gas 26 is a hydrogen rich gas which can be used for operating of fuel cells and is the product of the auto-thermal reaction.

As shown in FIG. 1, the reformer reactor 1 further comprises a preheating means 30 for preheating the hydrocarbon fuel 20. In FIG. 1, the fuel preheating means is illustrated as separate device 30, but it is also possible to integrate fuel injector 22 and fuel preheating means 30 into a single device. If the fuel injector 22 is additionally in heat conductive contact with the side wall 8a, heat generated in the reaction chamber 10 can be transferred to the fuel injector 22, where it can be used to preheat the hydrocarbon fuel 20.

In the following the operation of the reformer reactor 1 is described by means of the exemplary conversion of diesel as hydrocarbon fuel into hydrogen with an air/steam-mixture as oxidizing agent. The reaction for the conversion is auto-thermal.

According to the invention air and steam are mixed before the air/steam-mixture 14 is injected by oxidizing agent supply port 16 into space 12 which serves as air/steam passage for transportation of the air/steam mixture 14 from oxidizing agent supply port 16 to oxidizing agent inlet 18 of the reformer reactor 1.

On the way to the plurality of inlet orifices 18 in the inner wall 4 of housing 2 the air/steam-mixture 14 is preheated by heat transfer from the inner wall into the air/steam mixture, whereby the heat transfer also cools the inner wall 4 of reaction chamber 10. By cooling the inner wall 4 of the reaction chamber 10 the risk of diesel fuel molecules in the reaction chamber 10 burning to soot when hitting the reaction chamber wall, is reduced. The inner wall 4 of the reaction chamber 10 is heated by the substantially homogenous oxidation taking place in the reaction chamber 10 when oxygen coming from the air/steam-mixture 14 reacts with "lighter" hydrocarbon molecules of the diesel fuel 20 having shorter chains ($C_xH_y + O_2 \rightarrow CO_2 + CO + H_2O$).

The air/steam-mixture 14 is forced through the orifices 18 into the reaction chamber 10 of the reactor forming a substantially homogenous air/steam fume in the reaction chamber 10, where it is mixed with diesel fuel 20 being sprayed into the air/steam fume by means of fuel injector 22.

For a successful mixing of the diesel fuel 20 and air/steam fume 14 a substantially perfect atomization or vaporization of the diesel fuel 20 into the air/steam fume 14 is required in order to substantially prevent condensation of the fuel 20 or air/steam fume 14. Since such an unwanted condensation likely occurs due to temperature differences between the preheated air/steam fume 14 and the normally cooler diesel fuel 20, according to the invention, also the diesel fuel 20 is preheated by preheating means 30. A substantially perfect fuel atomization or vaporization and subsequent air/steam mixture is achieved by preheating the diesel fuel 20 to a temperature close to, but below the lowest boiling point of the fuel, whereby also heat for a substantially perfect atomization or vaporization is provided. Preferably, also the air/steam fume 14 is preheated to a temperature in the same range or higher than the temperature of the diesel fuel 20, whereby an elevated temperature between fuel 20 and steam 14 is provided, which in turn substantially prevents condensation.

Since fuel, and particularly diesel fuel, is a mixture of different components, whereby each of which has a different boiling point, the air/steam mixture is preferably preheated to a temperature higher than the boiling point of the lightest components of the diesel fuel which defines the lowest boiling point of the diesel fuel. If the temperature of the preheated air/steam mixture is higher than the temperature given by the lowest boiling point of the diesel fuel, the light components of the fuel are substantially prevented from condensation and the temperature of the fuel/air/steam mixture converges to the boiling points of the heavier components of the fuel, whereby the substantially complete vaporization of the fuel can be easier achieved. It should be noted that a condensation of the air/steam mixture due to coming into contact with the "cooler" preheated fuel does not take place, since the air/steam mixtures is not cooled below its boiling point when it comes in contact with the preheated fuel.

The combination of fuel preheating and mixing the atomized fuel with the air/steam fume results in a substantially completely homogenous reactant mixture that allows for substantially complete conversion of the hydrocarbon fuel which in turn allows for an efficient production of fuel cell grade hydrogen.

Dependent on the location, size, and distance between the orifices and the fuel injector 22, inside reaction chamber 10 a turbulent mixture of the air/steam-fume with the diesel fuel spray is achieved, so that the mixture is substantially completely homogenous before it comes into contact with the catalyst 28.

This substantially homogeneous gas mixture is then introduced into catalyst 28 where the hydrocarbons of the diesel fuel 20 are undergoing the auto-thermal reaction process. In the auto-thermal reaction process taking place inside the catalyst hydrogen (H), CO and CO2 are produced as dominant process products. These products are processed in subsequent steps outside the reformer with the aim to separate H from all other process products.

REFERENCE LIST

1 Reformer reactor
2 housing
4 inner wall
6 outer wall
8a, b>sides faces
10 reaction chamber
12 space=oxidizing agent passage
14 oxidizing agent
16 oxidizing agent supply port
18 oxidizing agent inlet
20 hydrocarbon fuel
22 hydrocarbon fuel inlet
24 hydrogen rich gas outlet
26 hydrogen rich gas
28 catalyst
30 preheating means

The invention claimed is:

1. A reformer reactor for converting hydrocarbon fuels into a hydrogen rich gas for fuel cells and/or exhaust treatment applications by auto-thermal reaction comprising
 a housing with two side faces forming a reaction chamber of the reformer reactor,
 a fuel inlet which is provided in one of the two side faces for providing hydrocarbon fuels into the reaction chamber, wherein hydrocarbon fuel and oxidizing agent are brought together in the reaction chamber,
 an inner wall and an outer wall forming a space in-between, wherein the space defines an oxidizing agent passage between an oxidizing agent supply port provided in the outer wall and an oxidizing agent inlet provided in the inner wall, and a fuel preheating means which preheats the hydrocarbon fuel before the hydrocarbon fuel enters the reaction chamber, the fuel inlet comprising a fuel injector and the preheating means being an integral part of the fuel injector, wherein the fuel injector and the preheating means are a single device, wherein the fuel injector is in heat conducting contact with the one of the side faces so that heat is transferred from the reaction chamber to the fuel injector to preheat the hydrocarbon fuel, and wherein the inner wall is adapted to preheat the oxidizing agent to substantially the same or to a higher temperature range as the hydrocarbon fuel.

2. A reformer reactor according to claim wherein the preheating means preheats the hydrocarbon fuel to a temperature roughly below a lowest boiling point of the fuel.

3. A reformer reactor according to claim 1, wherein the fuel inlet is formed as a fuel injector.

4. A reformer reactor according to claim 1, wherein the oxidizing agent inlet is located in the vicinity of the fuel inlet, for providing an oxidizing agent to the reaction chamber.

5. A reformer reactor according to claim 4, wherein the oxidizing agent inlet comprises a plurality of orifices introducing the oxidizing agent into the reactor chamber, the plurality of orifices being, at least one of different sizes, different shapes, and in different locations.

6. A reformer reactor according to claim 5, wherein the at least one of size, shape, and location of the plurality of orifices depends on the used hydrocarbon fuel and/or the used oxidizing agent.

7. A reformer reactor according to claim 1, comprising a catalyst for the auto-thermal reaction in the reaction chamber, wherein the catalyst is a metal grid or ceramic monolith.

* * * * *